(12) United States Patent
Furuya

(10) Patent No.: US 8,072,632 B2
(45) Date of Patent: Dec. 6, 2011

(54) NETWORK COMPLIANT OUTPUT DEVICE, INFORMATION PROCESSING APPARATUS, CONTROL METHOD THEREFOR, COMPUTER PROGRAM ON COMPUTER-READABLE STORAGE MEDIUM, AND NETWORK SYSTEM WHICH DETERMINE ALTERNATIVE NETWORK COMPLIANT OUTPUT DEVICE

(75) Inventor: Tomoyuki Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1264 days.

(21) Appl. No.: 11/550,463

(22) Filed: Oct. 18, 2006

(65) Prior Publication Data

US 2007/0086052 A1    Apr. 19, 2007

(30) Foreign Application Priority Data

Oct. 18, 2005    (JP) ................................ 2005-303711

(51) Int. Cl.
*G06F 3/12* (2006.01)
(52) U.S. Cl. ....... 358/1.15; 358/1.1; 358/1.14; 348/460; 348/552; 348/553; 348/473; 709/237; 709/220
(58) Field of Classification Search ................. 358/1.15, 358/1.1
See application file for complete search history.

(56) References Cited

U.S. PATENT DOCUMENTS

| 2002/0156947 | A1* | 10/2002 | Nishio | 710/36 |
| 2002/0186407 | A1* | 12/2002 | Laughlin | 358/1.15 |
| 2004/0003112 | A1 | 1/2004 | Alles et al. | 709/237 |
| 2004/0249907 | A1 | 12/2004 | Brubacher et al. | 709/220 |
| 2005/0052684 | A1* | 3/2005 | Ferlitsch | 358/1.15 |

FOREIGN PATENT DOCUMENTS

| JP | 2003-285510 | 10/2003 |
| JP | 2004-038956 | 2/2004 |
| JP | 2004-362594 | 12/2004 |

OTHER PUBLICATIONS

Hasegawa et al., Operation report production method for network printer, involves collecting operation start time and end time of network printer during maintenance work, after collecting start time and restoration time, for producing operation report, Dec. 22nd 2005, JP 2005352848.*

Koga Katsuyuki, Printer With Alternative Print Function, Oct. 7th 2003, JP 2003285510.*

* cited by examiner

*Primary Examiner* — Benny Tieu
*Assistant Examiner* — Martin Mushambo
(74) *Attorney, Agent, or Firm* — Fitzpatrick, Cella, Harper & Scinto

(57) ABSTRACT

According to this invention, when a network device is made to leave from a network, the network device transmits a network leaving message containing information specifying an alternative network device inputted in advance. This makes it possible for a client using the network device to automatically install a printer driver corresponding to an alternative network device. For this purpose, a printer as a network device stores in advance alternative printer information specifying an alternative printer. When an instruction to make the printer leave the network is provided for maintenance or the like, the printer broadcasts a Bye message containing alternative printer information to the network. The client, who has used the printer, stores the alternative printer information. In printing, if an alternative printer is successfully found by a search, and the corresponding printer driver has not been installed, the client executes setup processing for installation.

8 Claims, 17 Drawing Sheets

FIG. 6

```
<BYE>
        <Substitute>
                PRINTER IDENTIFIER
        </Substitute>
</BYE>
```

CURRENTLY,
YOU CANNOT PRINT BY
USING SELECTED XXXX

DO YOU WANT TO PRINT BY
USING ALTERNATIVE PRINTER ?

[ YES ]   [ NO ]

CURRENTLY,
YOU CANNOT PRINT BY
USING SELECTED XXXX

DO YOU WANT TO PRINT BY
USING ALTERNATIVE PRINTER ?

ALTERNATIVE PRINTER 
INFORMATION

830 — LOCATION : OFFICE ROOM 31
PRINTER NAME : LBP-2810
DRIVER INSTALLATION : REQUIRED

[ YES ]   [ NO ]

F I G. 11
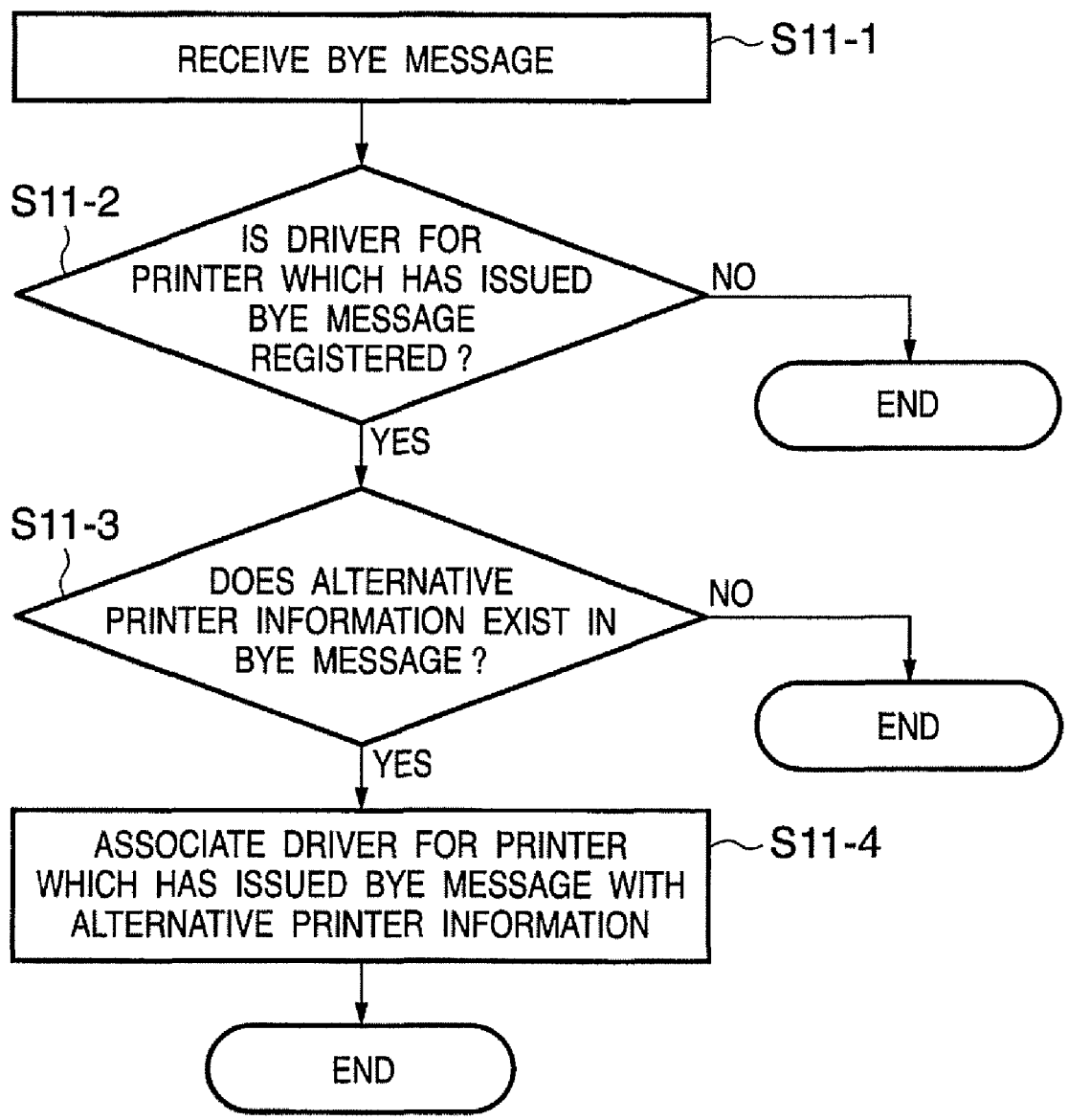

NETWORK COMPLIANT OUTPUT DEVICE, INFORMATION PROCESSING APPARATUS, CONTROL METHOD THEREFOR, COMPUTER PROGRAM ON COMPUTER-READABLE STORAGE MEDIUM, AND NETWORK SYSTEM WHICH DETERMINE ALTERNATIVE NETWORK COMPLIANT OUTPUT DEVICE

BACKGROUND OF THE INVENTION

1. Field of the Invention

The present invention relates to a network device, an information processing apparatus, a control method therefor, a computer program, a computer-readable storage medium, and a network system.

2. Description of the Related Art

Conventionally, the print data generated by a client PC is transmitted to a printer on a network to make the printer print it.

Along with this operation, in order to improve user-friendliness and ease of use in terms of the use of a network compliant printer (network printer), there have been developed application software for searching for a network printer which provides services, utility software, an operating system, and the like. Various kinds of protocols and architectures have been proposed in this case. Typical examples are Japanese Patent Laid-Open No. 2004-038956 (to be referred to as reference 1 hereinafter) and Japanese Patent Laid-Open No. 2004-362594 (to be referred to as reference 2 hereinafter).

In addition, a plurality of enterprises and standardization organizations have proceeded with specification formation to extensively apply "plug and play", which has been applied to local I/O connection printers, to network printers.

For example, UPnP (Universal Plug and Play) which has been mainly developed by Microsoft, USA, and WSD (Web Services for Devices (WS-Discovery/WS-MetadataExchange)) are known. In addition, there is BMLlinks (Business Machine Linkage Service) which has been progressed by Japan Business Machine Makers Industrial Association (JB-MIA), Renedzvous supported by OS X developed by Apple Computer USA, and the like.

As a mechanism which allows a user to select a printer suitable for his/her purpose and application from many printers connected to a network, software which operates on servers or clients connected to the same network has been proposed (e.g., Japanese Patent Laid-Open No. 2003-285510; to be referred to as reference 3 hereinafter). This software is designed to search for network printers, acquire the functions of the network printers, and display them in the form of a list, thereby prompting the user to select a printer. At the same time, if a printer driver which controls the printer does not exist in the client of the user, the software installs the printer driver in substitution for the user.

The conventional technique described above, however, only enumerates a plurality of printers as candidates to be selected by the user, but does not specify any printer which the user should use. After all, the user needs to, for example, make inquiries to the administrator who controls such network systems and printers, or the administrator needs to announce a printer to be used. That is, it often occurs that the operation load on the administrator does not reduce.

The reason lies in the lack of knowledge of printer functions on the part of the user.

With the recent improvement in the performance of printers, various kinds of printer functions have been developed. In general, however, the user does not require functions other than printer functions which he/she uses, and has no interest in them. However, information from printers enumerated as candidates by the conventional technique contains information other than the information in which the user has interest, thus making it difficult to specify an optimal printer to be used. That is, the user requires an advice from the administrator.

Another reason is that when users are made to select printers to be used, selection will concentrate on a specific printer. When a plurality of printers are enumerated, the users strongly tend to select a printer with most functions. In addition, if a printer which has been used fails, and the user must select an alternative printer, he/she tends to select a printer of the same model as that has been used. As a consequence, the same printer is repeatedly used. In order to make the frequencies of use of printers uniform, the administrator needs to designate a printer for, for example, each department.

Still another reason lies in a network policy. For example, in some case, the administrator strictly manages applications and drivers installed in the client PCs of users. When such management is to be performed, it is necessary to avoid new printer drivers from being randomly installed in the client PC of each user. The user should be made to select a printer which can print by using the printer driver which has been used. If, however, the user does not recognize the PDL (Page Description Language) or the like used by the printer, it is difficult to make the user select such a printer. This makes it necessary for the administrator to designate a printer to be used.

As described above, when a plurality of network printers are used, the operation load on the system administrator increases.

Assume that an old printer connected to a network is replaced by a new printer, or a given printer cannot be used for a short period of time due to paper jam or maintenance such as toner change. In this case, the administrator needs to introduce an alternative printer to each user. Although the administrator may introduce the printer to each user by mail or the like in advance, all the users do not always have knowledge enough to set or change the printer driver for each PC. In reality, few users have such knowledge, and hence the administrator must perform setting operation for each PC.

As a technique of making an alternative printer print at the time of maintenance for such a short period of time, reference 3 discloses a technique of registering in advance the IP of an alternative printer in a printer to be maintained and directly transferring print data to the IP of the alternative printer during maintenance.

According to patent reference 3, however, a printer which can serve as an alternative needs to process the same PDL as that processed by the printer to be maintained. In addition, there is still a problem that it is difficult for the user to know whether the printer used as an alternative exists. Furthermore, if the printer to be maintained is disconnected from the network, the problem of inability of even transferring print data to the alternative printer remains unsolved.

SUMMARY OF THE INVENTION

The present invention has been made in consideration of the above problems, and has as its object to provide a technique of, when a network device leaves a network, allowing the user of an information processing apparatus using the network device to use an alternative device without requiring any complicated operation.

In order to achieve the above object, for example, a network compliant output device of the present invention comprises the following arrangement.

There is provided a network compliant output device which includes network communication means, executes a job in accordance with a request received from a network through the network communication means, and is compatible with network Plug and Play, comprising input means for inputting information specifying an alternative network compliant output device for executing a job in substation for the device, and transmission means for transmitting a network leaving message containing information specifying an alternative network compliant output device, which is input by the input means, when the device leaves the network under a predetermined condition.

In addition, an information processing apparatus of the present invention comprises the following arrangement.

There is provided an information processing apparatus which allows network communication means to be mounted therein, detects a network compliant output device compatible with network Plug and Play through the network communication means, and is equipped with an operating system which automatically installs a corresponding device driver, comprising first determination means for, when receiving a network leaving message from a network compliant output device through the network communication means, determining whether the network leaving message contains alternative device information specifying an alternative network compliant output device, association means for, when the first determination means determines that a received network leaving message contains alternative device information, storing the alternative device information in storage means in association with a device driver for the network compliant output device which leaves the network, second determination means for, when a selection event of the device driver occurs, determining whether the alternative device information is stored in the storage means in association with a selected device driver, and control means for, when the second determination means determines that no alternative device information exists, permitting an operating system to perform processing in accordance with the selection event, and for, when the second determination means determines that alternative device information exists, permitting the operating system to perform setup processing of a device driver indicated by the alternative device information so as to permit installation of the device driver indicated by the alternative device information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing the description format of a Bye message in this embodiment;

FIGS. 8A and 8B are views showing an example of a UI message window in this embodiment;

FIG. 11 is a flowchart showing a processing procedure to be executed when a client receives a Bye message in the first embodiment;

DESCRIPTION OF THE EMBODIMENTS

The embodiments of the present invention will be described in detail below with reference to the accompanying drawings. Note that the protocols and numerical values written in this embodiment are presented to facilitate the understanding of the embodiments, and the present invention is not limited to them alone unless otherwise specified.

First Embodiment

Figure 1:
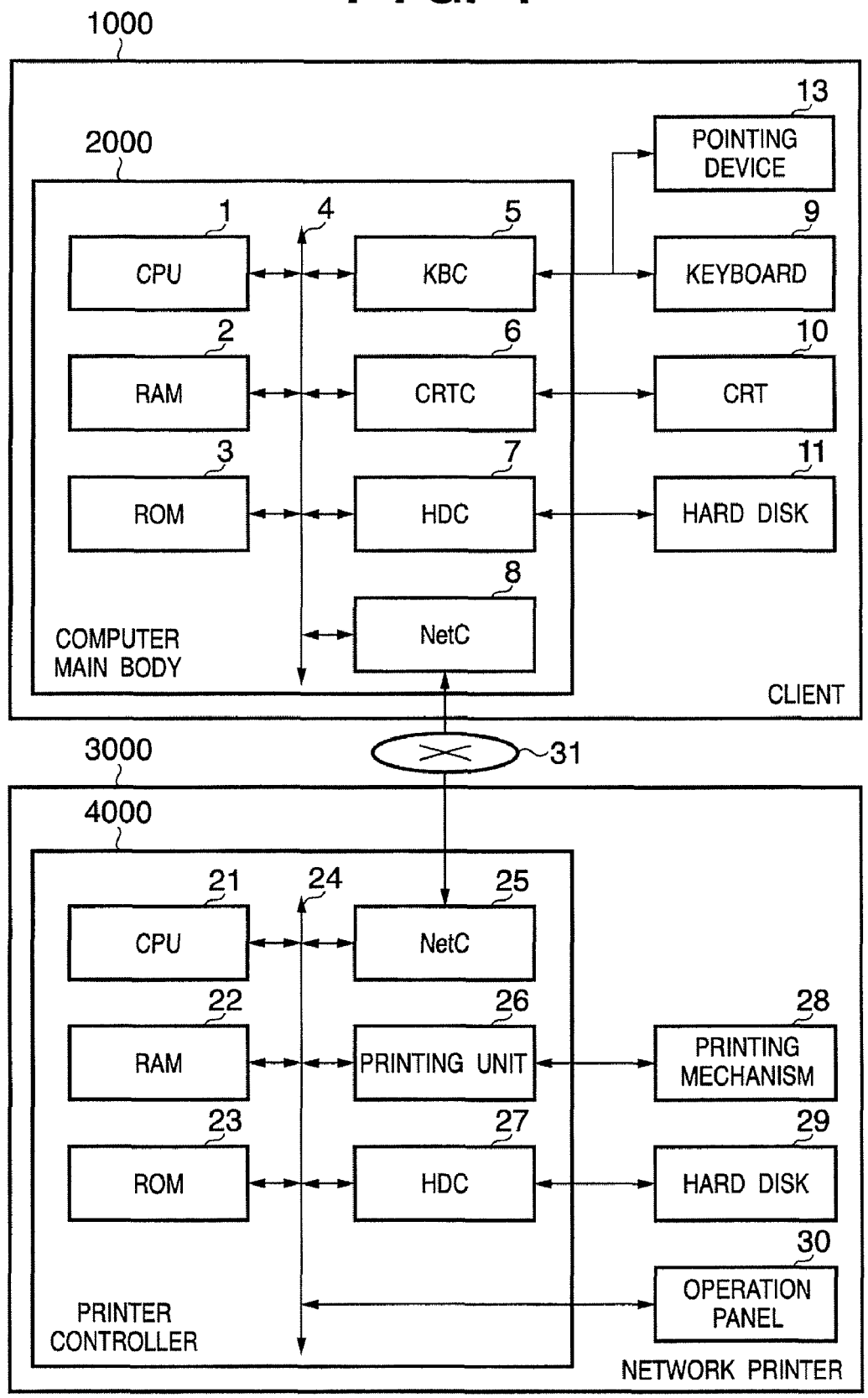
FIG. 1 is a block diagram showing the hardware configuration of a network print system according to an embodiment of the present invention, with attention being paid to one client and one network printer.

FIG. 1 is a block diagram showing the hardware configuration of a network print system according to an embodiment of the present invention, with attention being paid to one client and one network printer which are connected to each other. Referring to FIG. 1, a client 1000 and a network printer 3000 as a printing apparatus are connected to each other through a network 31. In the client 1000, a keyboard 9, CRT 10, hard disk 11, and the like which are external apparatuses are connected to a computer main body 2000.

When turning on the power supply of the computer main body 2000, a CPU 1 starts to control the respective elements connected to a bus 4. More specifically, first of all, the CPU 1 executes the BIOS and bootprogram stored in a ROM 3, loads the OS (Operating System) stored in the hard disk 11 into a RAM 2 through a hard disk controller (HDC) 7, and executes it. In this case, the CPU 1 loads various kinds of device drivers (including a network driver) from the hard disk 11 into the RAM and install them in the OS. The hard disk 11 stores various kinds of application programs and data files created by the respective applications in addition to the OS and the network device drivers.

Subsequently, the user inputs information from the keyboard 9 and a pointing device 13 such as a mouse through a keyboard controller (KBC) 5. In accordance with this operation, the CPU 1 performs display on the CRT 10 through a CRT controller (CRTC) 6, thereby constructing an interactive user interface. In accordance with an instruction from the user, the CPU 1 executes a desired application program (e.g., a document editing application), outputs print data to the network printer 3000, as needed, to make it print the data. When the CPU 1 executes an application and the user issues a print instruction by operating the keyboard 9 or the pointing device 13, the application activates a printer driver corresponding to the printer 3000, and transfers data to be printed to the printer driver. The printer driver translates the data into print data which can be interpreted by the printer 3000 (print data written in PDL in many cases), and outputs the result. The OS transfers the print data output from the printer driver to the device driver for a network controller 8. The network device driver transmits the data to the printer 3000 in accordance with a predetermined protocol (e.g., TCP/IP).

Note that in this embodiment, a client PC is assumed to be a personal computer (PC). However, a client is not limited to a PC as long as the present invention can be implemented. For example, a mobile information terminal such as a PDA, a cell phone, or a digital home appliance can be used as a client without any problem.

The network printer 3000 suitable for a network compliant output device according to the present invention comprises a printer controller 4000 (mounted as a print board), printing mechanism 28, hard disk 29, and operation panel 30.

The printer controller 4000 incorporates a CPU 21 which controls the overall apparatus through a bus 24. The CPU 21 performs processing on the basis of the control program stored in a ROM 23 (also storing font data). The CPU 21 uses a RAM 22 as a work area.

This control program includes communication processing (including the reception of print data) with the network through a network controller (NetC) 25. In addition, the program includes the processing of registering received print data as a print job queue in the hard disk 29 by controlling a hard disk controller (HDC) 27. The program also includes the processing of sequentially reading out print jobs registered in a queue through the HDC 27, interpreting them, and bitmapping them into print image data for the RAM 22. The program includes the printing processing of outputting the bitmapped print image data as image signals to the printing mechanism 28 (printer engine) through a printing unit 26. Furthermore, the program includes the processing based on an instruction input by the user through the operation panel 30 (comprising a display unit such as a liquid crystal display device, a touch panel, various kinds of buttons and switches, an LED, and the like).

Note that the network printer 3000 described above comprises the hard disk 29. However, this is not essential. In addition, in this case, the printer has been described as a network printer having only a printing function. However, this printer may be a multi-function peripheral device equipped with a scanner which scans originals. Furthermore, the printing mechanism 28 may be based on any kind of printing schemes including a scheme using a laser beam printer engine, a scheme using an inkjet printer engine which discharges ink droplets, and the like.

Figure 2:
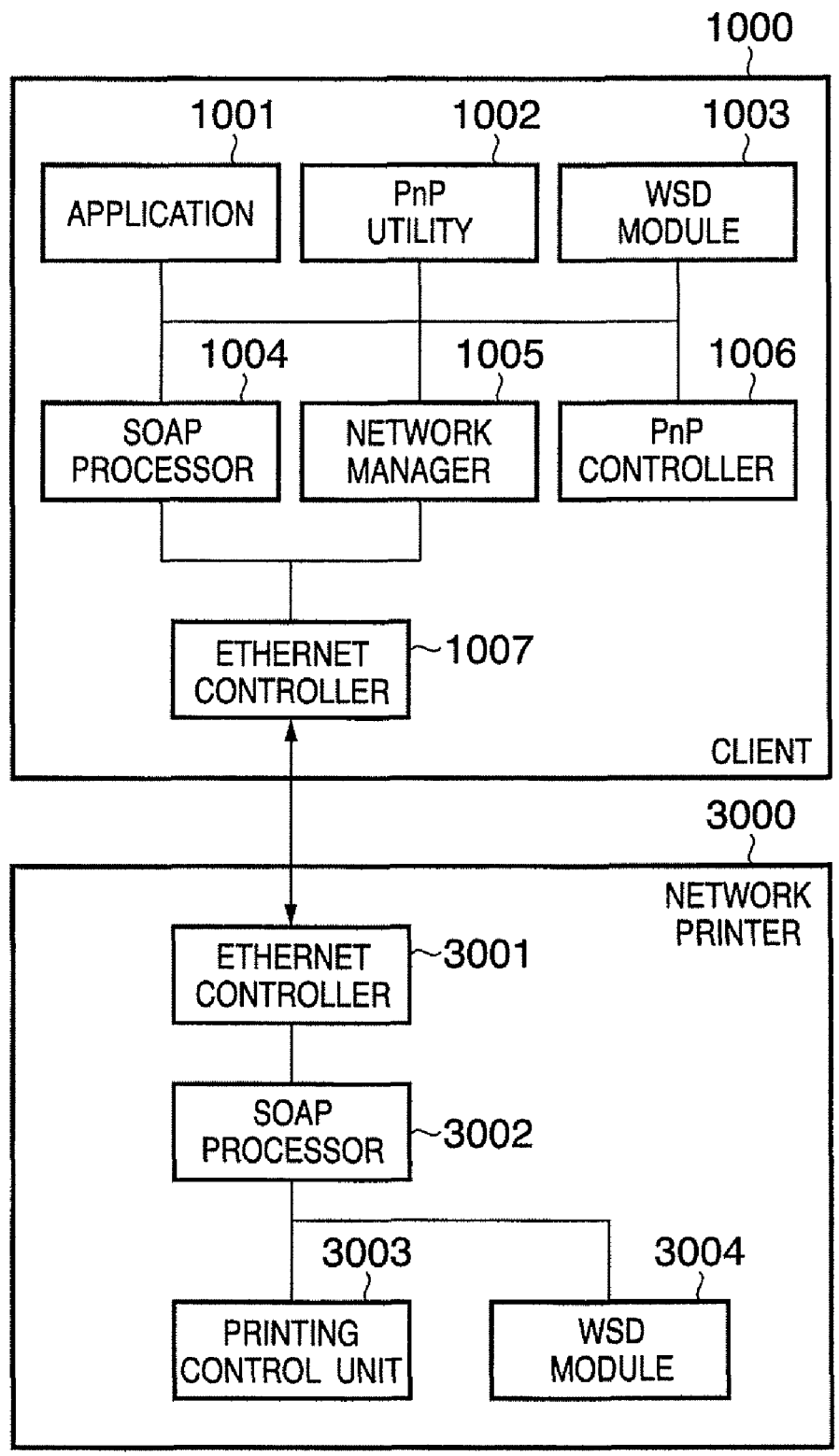
FIG. 2 is a block diagram showing modules associated with network connection between a client and the printer controller unit of a network printer.

FIG. 2 is a functional block diagram for explaining modules associated with network connection between the computer main body 2000 of the client 1000 and the printer controller 4000 of the network printer 3000 shown in FIG. 1.

The client 1000 implements a network communication function by using an Ethernet controller 1007. However, this is an example, and a wireless LAN communication means such as Wi-Fi (IEEE 80.11a/b/g) or Bluetooth may be used. The client 1000 includes a SOAP (Simple Object Access Protocol) processor 1004 on a layer upper than the Ethernet controller 1007 to implement two-way communication of data written in XML (extensible Markup Language) between a Plug and Play (PnP) utility 1002, a WSD module 1003, and an application 1001.

A network manager 1005 manages the Ethernet controller 1007, and includes a function of acquiring setting information and information associated with a communication state.

The Plug and Play (PnP) utility 1002 has a function of controlling the network manager 1005, acquiring Ethernet controller information under operation and setting information therefor, and recording the information on the RAM 2. The PnP utility 1002 also controls a UI for Plug and Play setting and records the setting contents on the RAM 2. The PnP utility 1002 converts the setting information into XML (extensible Markup Language) information and records it on the RAM 2 in the form of XML.

The WSD module 1003 performs processing based on the WS-Discovery specifications promoted by Microsoft, USA and the like. More specifically, the WSD module 1003 responds to a Hello message notified when a network device such as a network printer connects to the network, issues a Probe message for making the PC search for a network device, and responds to a Bye message notified when a network printer is disconnected from the network. The WSD module 1003 also acquire the attribute information of a network printer by issuing a GetMetadata message on the basis of the WS-MetadataExchange specifications.

When finding a network printer by these message processes, the WSD module 1003 notifies a PnP controller 1006 of the attribute information of the found network device. The PnP controller 1006 has a function of loading the corresponding driver and utility software from the hard disk 11 into the RAM 2 on the basis of the attribute information and installing them in the OS.

The application 1001 is, for example, a wordprocessor. When an edited document is to be printed by a network printer, the application 1001 outputs the data to be printed to a printer driver (or an installed utility) installed by the PnP controller 1006. The printer driver converts the data to be printed into data (print data) in a PDL form which can be interpreted by the network printer 3000, and transmits the print data to the network printer 3000 through the OS.

The network printer 3000 also corresponds, as a communication function, to Ethernet, and an Ethernet controller 3001 controls the communication function. The network printer 3000 includes a SOAP (Simple Object Access Protocol) processor 3002 on a layer upper than the Ethernet controller 3001 to implement two-way communication of data written in XML (extensible Markup Language) between a WSD module 3004 and a printing control unit 3003.

The WSD module 3004 transmits a Hello message upon connection to the network through the SOAP processor 3002 on the basis of the WS-Discovery specifications promoted by Microsoft, USA and the like, responds to a Probe message issued from the client 1000, and transmits a Bye message when leaving from the network. In addition, the WSD module 3004 returns the attribute information which the network printer 3000 has in response to a GetMetadata message issued from the client 1000 on the basis of the WS-MetadataExchange specifications.

Procedures for a search and the installation of a device driver for the network compliant device 200 on the basis of the WSD specifications between a client terminal 100 (corresponding to the client 1000 described above) and a network compliant device 200 (corresponding to the network printer 3000 described above) will be briefly described with reference to FIGS. 17A and 17B.

Figure 17A:
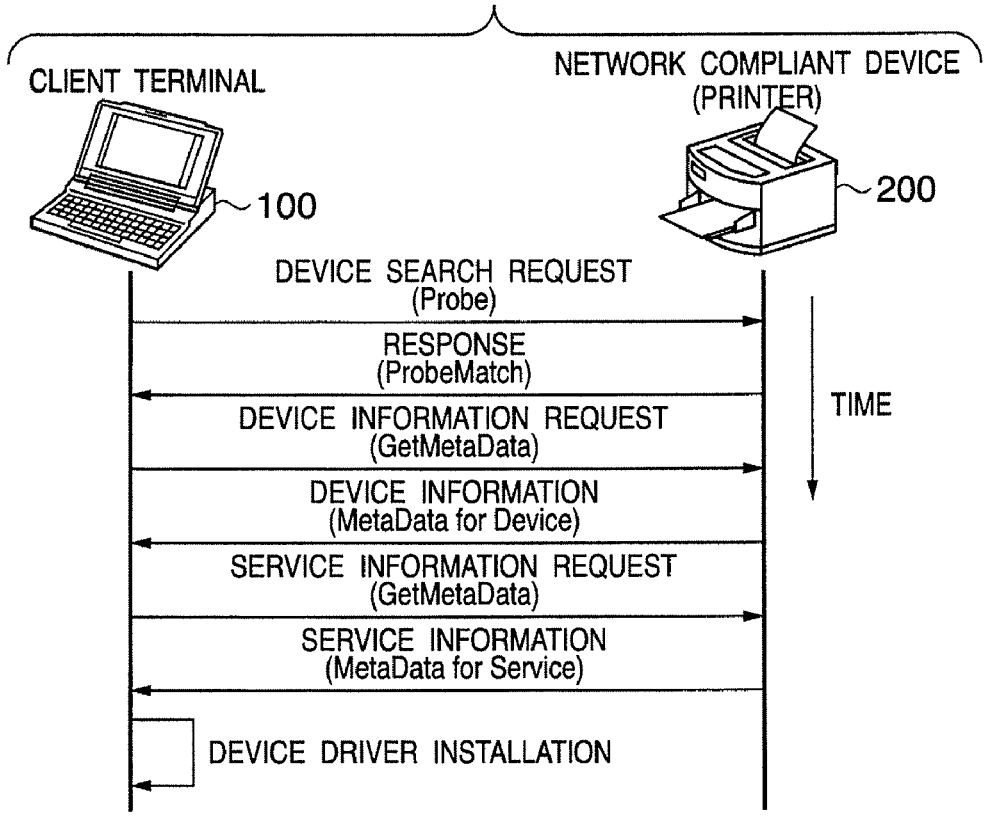
FIGS. 17A and 17B are views showing a general sequence from the instant at which a UPnP network device is found to the instant at which a corresponding device driver is installed.

FIG. 17A shows a procedure to be executed when the client terminal 100 connects to the network or the user inputs an instruction to search for a network device.

The client terminal 100 multicasts (broadcasts) a Probe message as a device search request to a network. Upon receiving this Probe messages the network compliant device 200 (the network printer 3000 in this embodiment) unicasts a response message (ProbeMatch) to the client terminal 100 in response to the message. Since the device and the terminal have known their communication destinations, subsequent transmission/reception is performed by unicasting.

By receiving the above response message, the client terminal 100 can detect the presence of the network compliant device 200 on the network. Therefore, the process proceeds to the next step to transmit (unicast) a device information request message (GetMetaData) to the network compliant device and acquire device information (MetaData for Device). Subsequently, the client terminal 100 transmits a service information request message (GetMetaData), and acquires service information (MetaData for Service).

As a result of the above operation, the client terminal 100 can obtain the model name and attribute information (information indicating that the device is a printer) of the network compliant device 200. The client terminal 100 therefore installs the corresponding device driver (the printer driver in the above case).

Figure 17B:
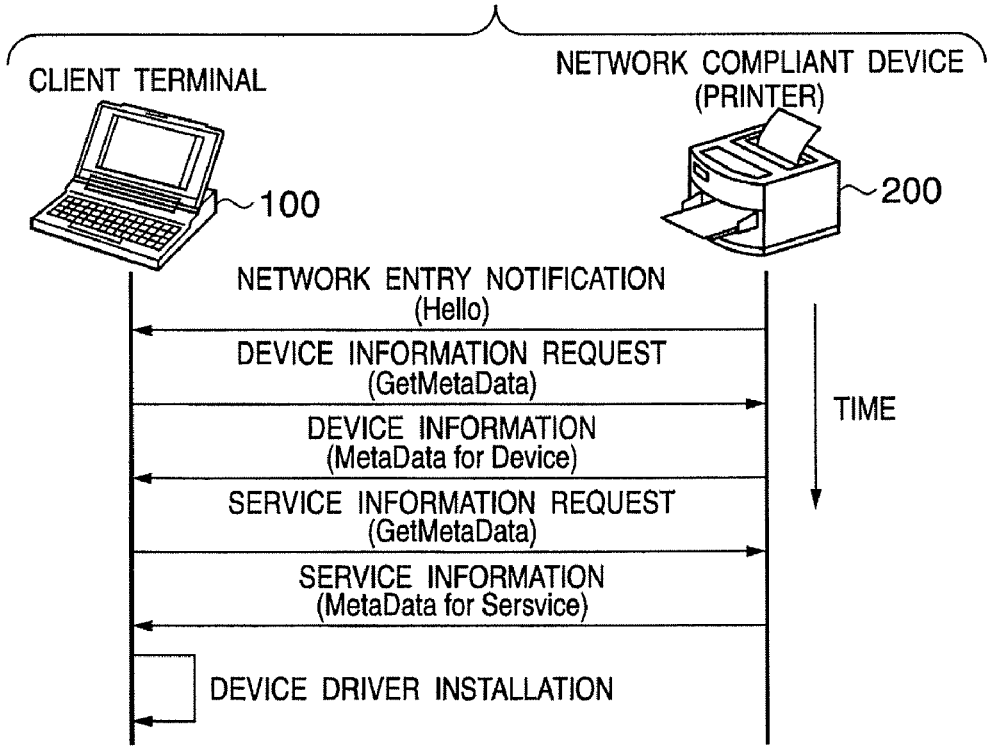

FIG. 17B shows a procedure to be executed in a case wherein after completing connection to the network, the client terminal 100 makes the network compliant device 200 enter the network. The entry of the network compliant device 200 to the network can be easily understood as being analogous to the power-on of the network compliant device 200.

First of all, the network compliant device multicasts an entry message (Hello) for entry to the network. By receiving this entry message, the client terminal 100 detects the presence of the network compliant device 200, and hence transmits a device information request message. The subsequent procedure is the same as that in FIG. 17A.

Network PnP can be implemented in the above manner. When the client terminal 100 detects an unknown network compliant device, a device driver is automatically installed in the terminal. This makes it possible to reduce the operation load on the user.

Figure 3:
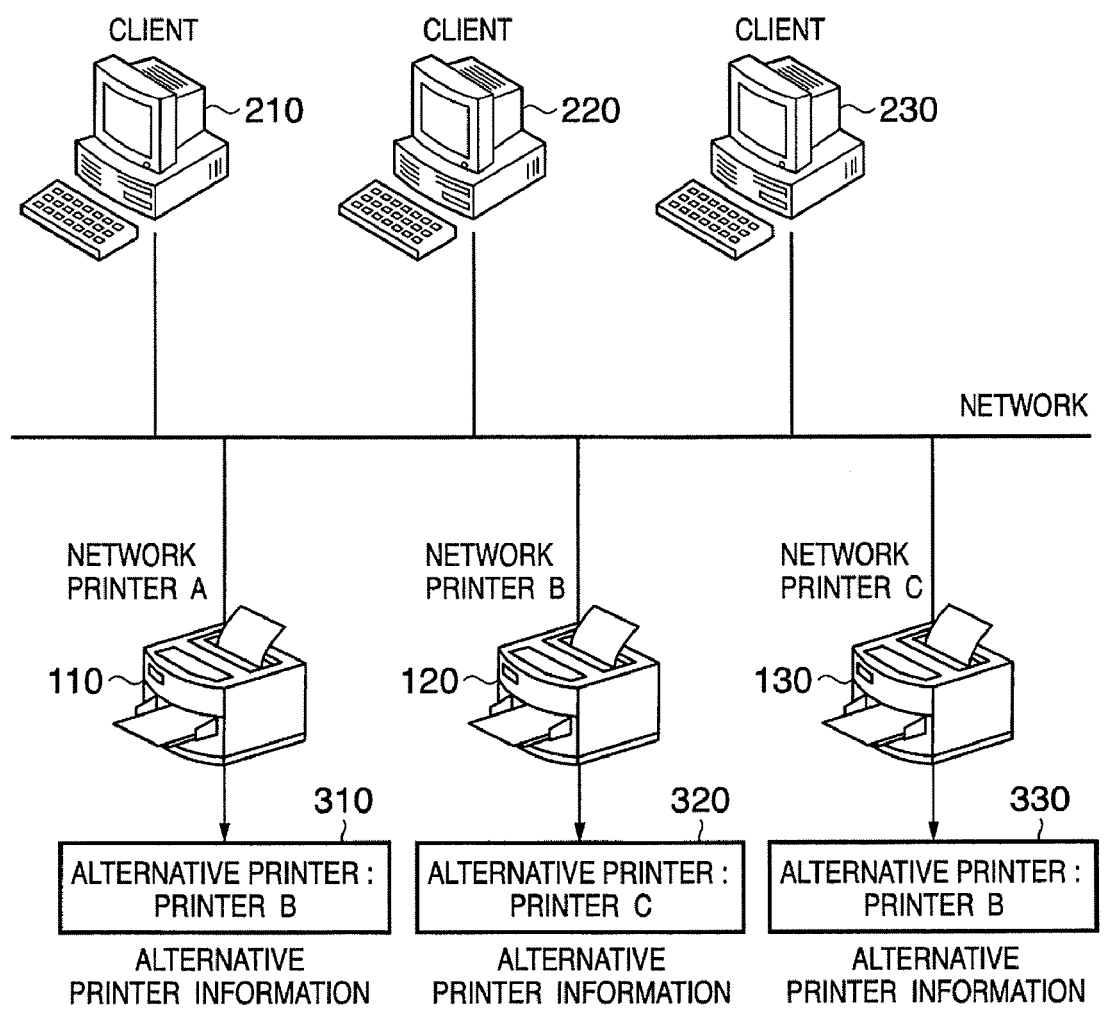
FIG. 3 is a view showing an example of the configuration of the network print system according to this embodiment.

Returning to the description, FIG. 3 shows an example of the configuration of a network print system to which this embodiment can be applied.

Referring to FIG. 3, assume that a printer A 110, printer B 120, and printer C 130 on the network each have the configuration of the network printer 3000 in FIG. 2, and clients 210, 220, and 230 each also have the configuration of the client 1000 in FIGS. 1 and 2.

The network printer A 110 to network printer C 130 in this embodiment each store alternative printer information therein (e.g., a hard disk or a nonvolatile memory). This alternative printer information is information indicating a network printer (alternative printer) which performs printing processing in substitution for the printer when the printer leaves from the network. FIG. 3 shows a case wherein alternative printer information 310 stored in the printer A 110 is information designating the printer B 120. Alternative printer information 320 stored in the printer B 120 designates the printer C 130 as an alternative printer. Alternative printer information 330 stored in the printer C 130 designates the printer B 120 as an alternative printer.

In this case, all the network printers hold alternative printer information. However, it suffices if at least one network printer holds such information.

Figure 4:
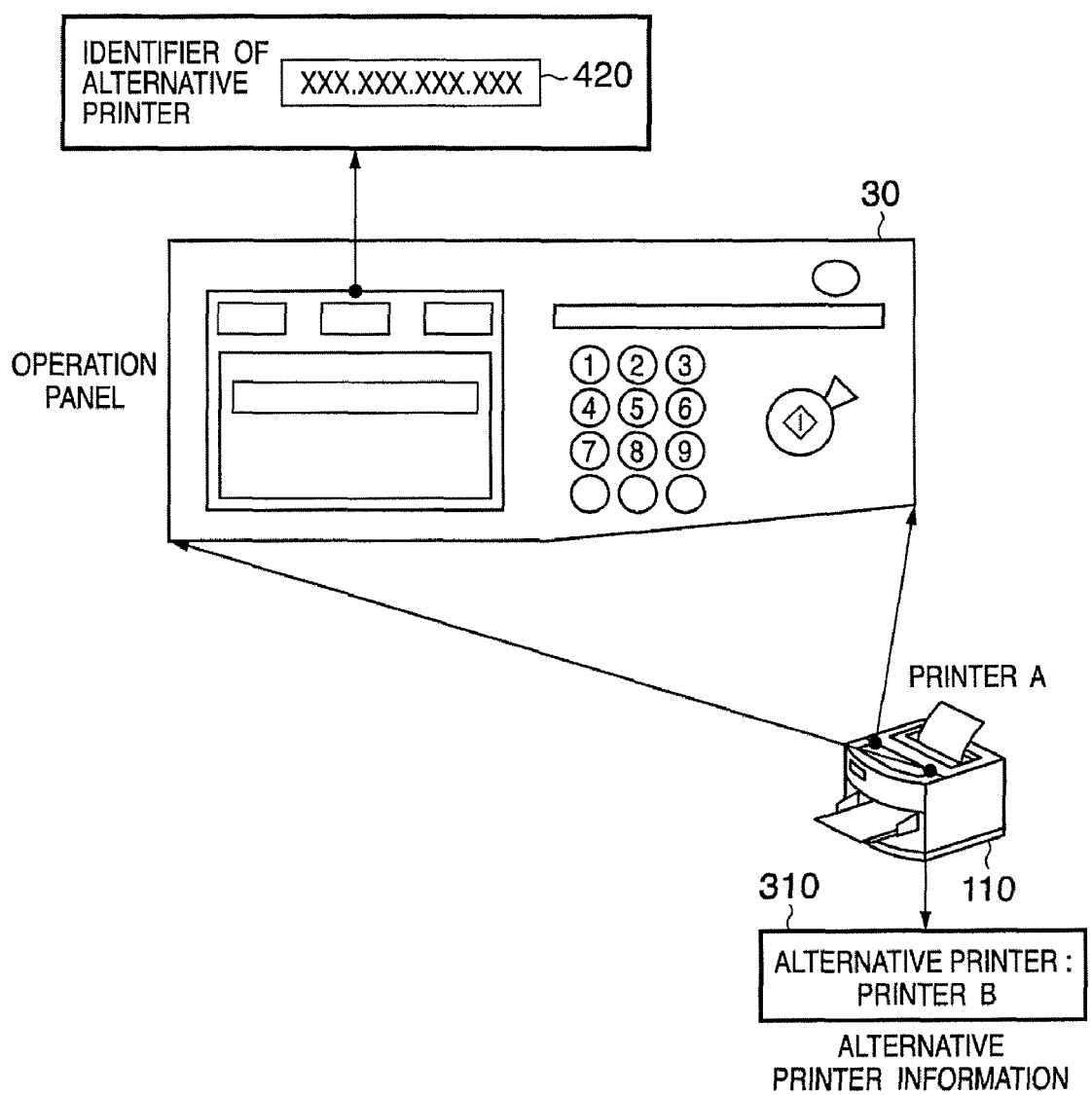
FIG. 4 is a view showing an alternative printer designation method using the operation panel of a network printer.

FIG. 4 shows an example in which an alternative printer (the network printer B 120 in this embodiment) is designated for the network printer A 110 in FIG. 3.

As shown in FIG. 4, when the user designates an alternative printer by operating the operation panel 30 provided on the network printer A 110, an input window 420 for the identifier information of an alternative printer on the network is displayed. In this embodiment, this identifier is an IP address on the network. Since it suffices if an identifier is unique, a MAC address may be used or the name of an alternative printer on the network may be used if there is a DNS server which holds the relationship between IPs and names on the network. Information to be set may contain a character string indicating the installation place or the like of the alternative printer.

In the above case, the operator needs to know at least an identifier for specifying an alternative printer. In general, therefore, the network administrator sets this user. In order to facilitate this setting, for example, the following operation may be performed.

First of all, the operator sets, on the network, a server which stores installation places such as room numbers and departments and the names and identifiers of network printers installed in the places. When the operator operates the operation panel on a given printer to issue an instruction to set the above alternative printer, the operator accesses the corresponding server to acquire a list of places and display it so as to allow the operator to select a desired place. The operator selects a place nearest to the installation place of the network printer under operation (the same place if there are a plurality of printers in the same room). As a result, the information of a list of printers installed in the selected place is acquired, and is displayed to allow the operator to select a printer. The operator selects a desired printer from the list. As a consequence, one alternative printer is determined, and hence the identifier information (IP address information in this embodiment) of the designated alternative printer is acquired. This makes it possible for the administrator to easily set an alternative printer. If it is not preferable to install new software such as a printer driver in the client environment of the user, a printer of the same model or a printer which can process the same print data can be designated as an alternative printer. Note that in this series of processing, if a Web server is used as the server and a Web client is operated as a network printer, the operator can perform setting with the same sense of operation as that using a familiar UI as on a PC or the like.

Identifier information 420 set by the operator through the operation panel 30 of the network printer A 110 is stored as the alternative printer information 310 in a storage area (a nonvolatile memory such as the hard disk 29 in this embodiment) in the printer A 110.

Figure 5:
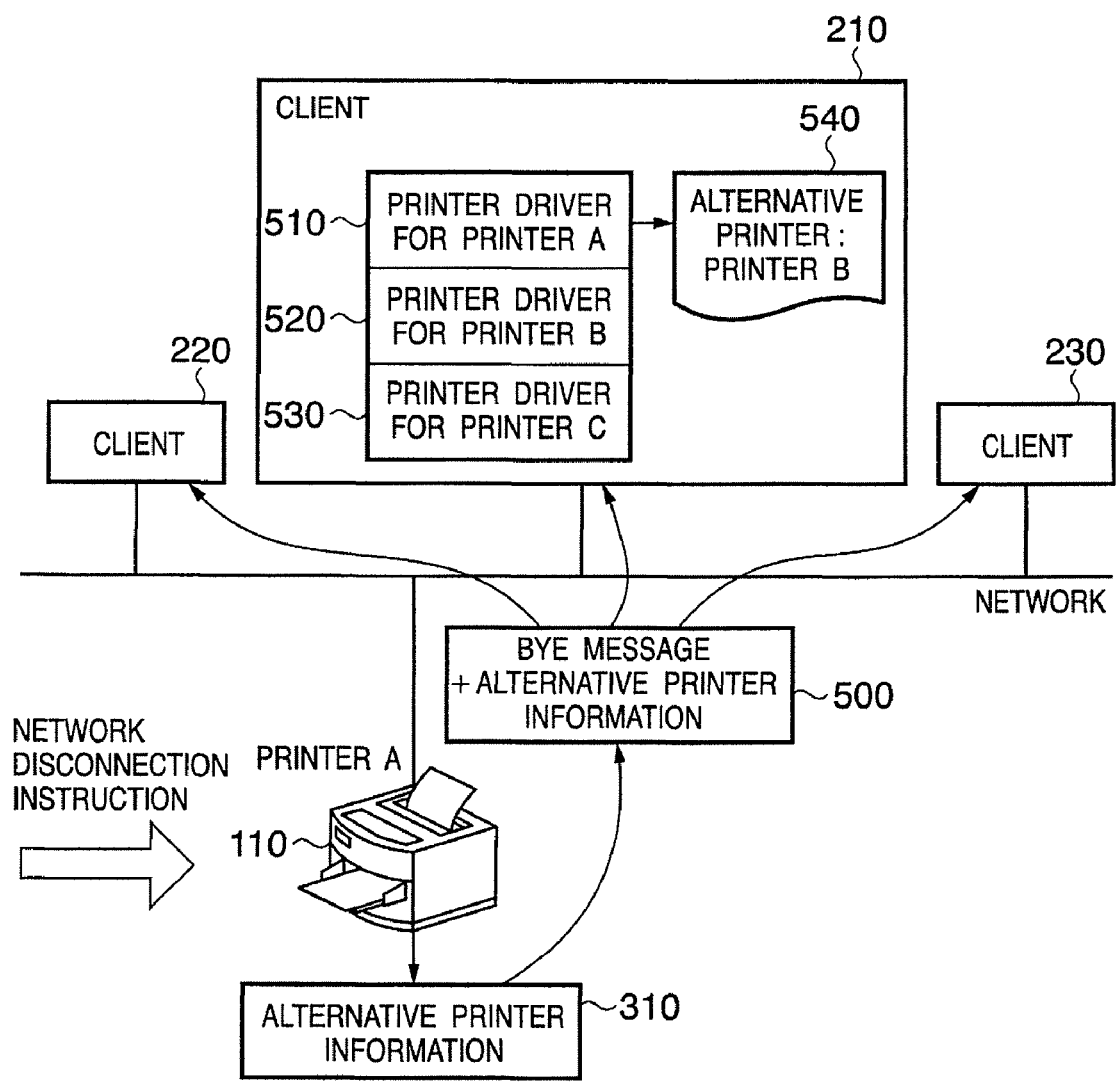
FIG. 5 is a view showing the sequence of a Bye message and an outline of processing by a client which has received the message.

FIG. 5 shows how a network printer in this embodiment issues a message declaring that it leaves from the network (Bye message) on the basis of the WS-Discovery specifications like those described with reference to FIG. 2.

Upon receiving a power OFF instruction or network disconnection instruction issued by the operator through the operation panel 30, the printer A 110 which has been connected to the network broadcasts (multicasts) a Bye message onto the network, and then performs network disconnection processing (power supply turning off or the like). At this time, if the printer A 110 internally stores the alternative printer information 310 like that shown in FIG. 4, the printer broadcasts a Bye message 500 added to the alternative printer information.

The client 210 will be described below. Note that the clients 220 and 230 also perform similar processing.

Upon receiving a Bye message from the printer A 110 through the network, the client 210 determines whether an OS has already been installed in a printer driver 510 for the printer A 110. If it is determined that an OS has been installed, the client 210 stores the corresponding printer driver (the printer driver 510 in the case shown in FIG. 5) upon associating the alternative printer information added to the received Bye message with the driver (540).

Assume that the client 220 has not installed the printer driver for the printer A 110. In this case, the client 220 does not perform processing for alternative printer information even if it receives the received Bye message.

FIG. 6 shows an example of a Bye message to which the alternative printer information transmitted from the network printer in FIG. 5 is added. This message is written in an XML form, and the printer identifier of the alternative printer is stored between tags <Substitute> and </Substitute> indicating the alternative printer. Although the message is written in an XML form, it may be written in a binary form instead of this form. For the sake of convenience, alternative printer information is stored in a Bye message on the basis of the WS-Discovery specifications. However, this information need not always be contained in a Bye message, and may be contained in a new message other than a Bye message. Alternatively, this embodiment may be configured to make a client which has received a Bye message acquire alternative printer information from the network printer which has issued the Bye message on the basis of the WS-MetadataExchange specifications instead of storing the alternative printer information in the Bye message.

Figure 7:
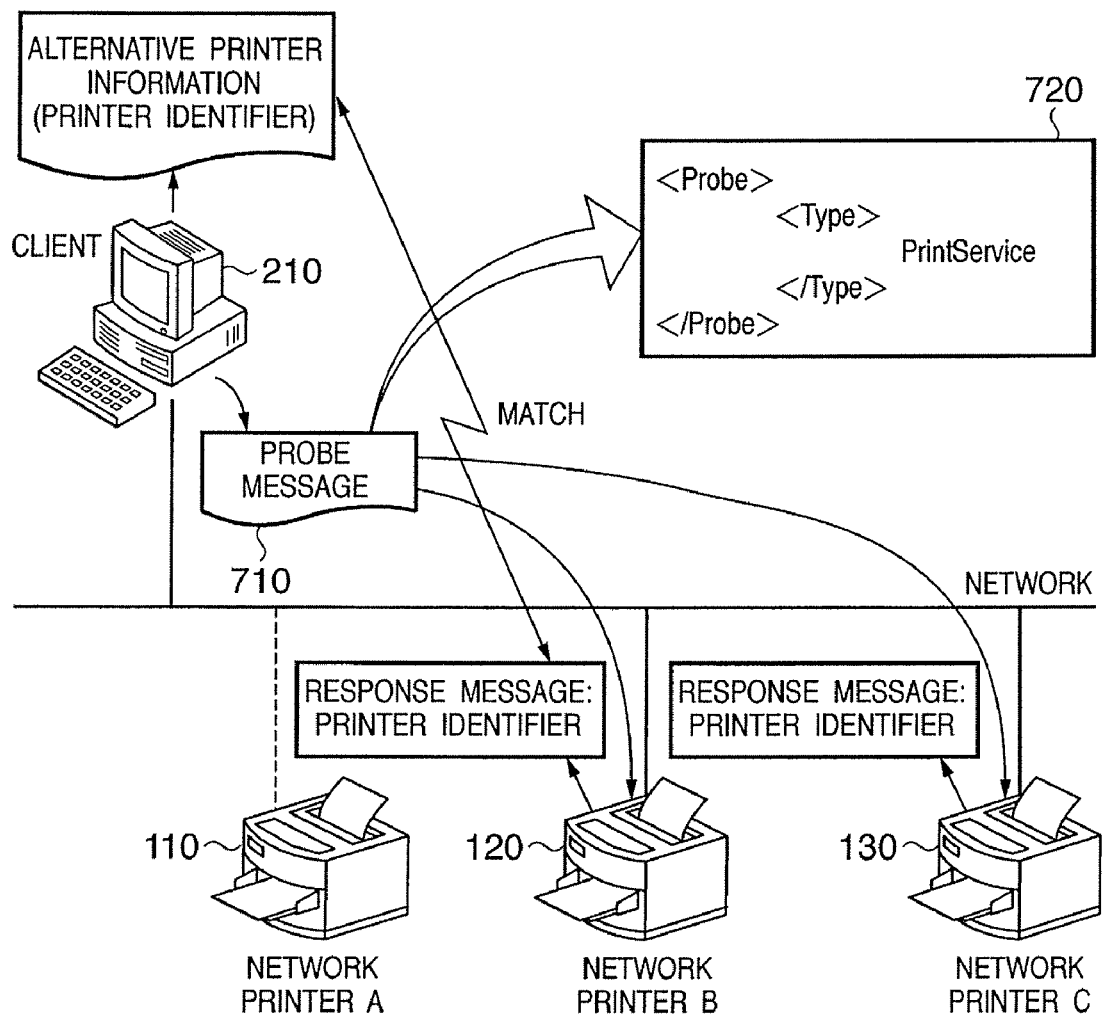
FIG. 7 is a view showing a Probe message issued from a client and an outline of discrimination processing for an alternative printer in this embodiment.

FIG. 7 shows processing to be performed by the client 210 in a case wherein a printer driver with which alternative printer information is associated is installed in the client 210 and is selected by the user or an application at the time of printing.

The presence of a printer driver with which alternative printer information containing a printer identifier is associated indicates that the network printer (the network printer A 110 in FIG. 7) initially designated by the printer driver has already left from the network, and printing cannot be performed. In this case, the client performs the processing of searching for an alternative printer on the network by using alternative printer information.

This embodiment will exemplify the operation of searching for an alternative printer by using a Probe message based on the WS-Discovery specifications.

First of all, the client 210 creates a Probe message 710, and broadcasts it onto the network. That is, the client 210 transmits the Probe message 710 to all the network printers on the network. The message at this point of time is written in an XML form like that denoted by reference numeral 720 in FIG. 7, and the information between the tags <type> and </type> designates the type of a device to be searched out. In this case, the purpose of a search is a printer, PrintService is set as this information.

Upon receiving the above Probe message, each of the network printer B 120 and network printer C 130 interprets the information between the tags <type> and </type>, and determines that the message is directed to itself. Each printer then creates a response message containing the printer identifier of itself, and returns (unicasts) it to the client 210 which has issued the Probe message.

As a result of the above operation, the client 210 receives response messages from the network printer B 120 and network printer C 130. The client 210 compares these pieces of issuing source information (the IP addresses of the network printer B 120 and network printer C 130) of these response messages with the printer identifier of the alternative printer information associated with the previous printer driver. If they differ from each other, the client 210 determines that the corresponding printer is not an alternative printer, and waits for a response message transmitted from another network printer. If they match each other, the client 210 determines that the network printer which has transmitted the message is an alternative printer. This embodiment has exemplified the case wherein the network printer B 120 is an alternative printer of the network printer A 110. At this point of time, therefore, the client 210 has been able to detect (specify) that an alternative printer of the network printer A 110 exists on the network.

FIGS. 8A and 8B show an example of a UI display message for inquiring of the user whether to perform printing by using an alternative printer, when the client 210 can specify the alternative printer.

FIG. 8A shows a case wherein a UI display message window 810 simply inquires of the user whether to perform alternative printing. If the user selects the "Yes" button, the current printer driver is switched to an alternative printer driver or an alternative printer driver is installed.

A UI display message window 820 in FIG. 5B displays, to the user, not only information indicating that alternative printing is to be performed, but also additional information 830 about the alternative printer. The additional information indicates, for example, the installation place of the alternative printer, whether it is necessary to install a driver, and the name of the alternative printer. In this case, as described with reference to the alternative printer information 310 in FIG. 4, the additional information may be information other than the printer identifier set in advance with the operation panel 30 or the like. Alternatively, as described above, a transmission request message for information specifying a target device may be transmitted to a server which manages network devices to acquire the information.

Assume that the network printer A 110 which has been initially used and the network printer B 120 as an alternative printer differ in model (or differ in PDL), and the printer driver for the alternative printer has not been installed. In this case, the process shifts to the processing of installing the printer driver for the alternative printer. In this case, as described with reference to FIG. 2, it suffices if the WSD module 1003 notifies the PnP controller 1006 of the attribute information acquired from the alternative printer driver, and the PnP controller 1006 executes installation of the corresponding printer driver on the basis of the attribute information.

Figure 9:
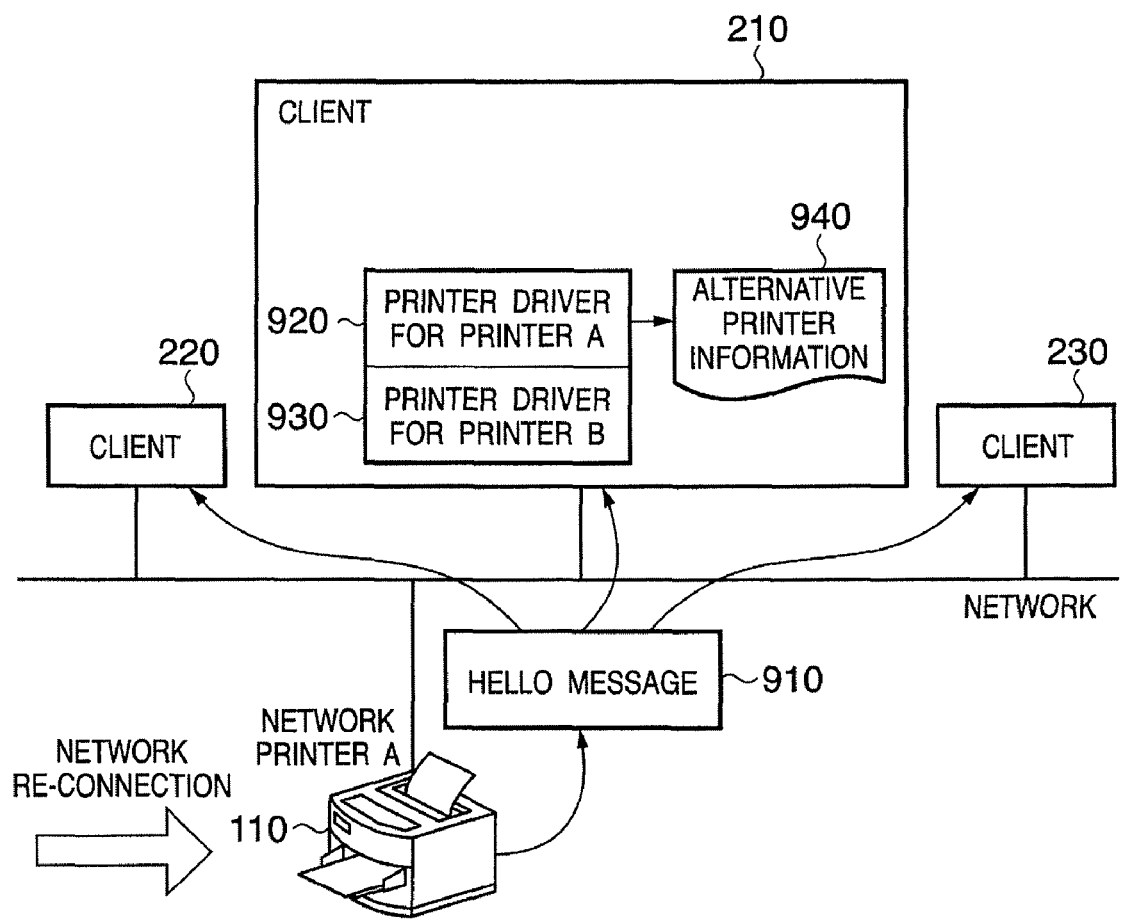
FIG. 9 is a view for explaining the sequence of a Hello message issued when a network printer which has left the network once connects to the network again, and an outline of processing by the client which has received the message.

FIG. 9 shows the processing to be performed when the network printer A 110 which has left (has been disconnected) from the network once and issued alternative printer information connects to the network again.

As described above, the network printer A 110 which has connected to the network gain transmits a Hello message 910. The client 220 or 230 in which the printer driver for the network printer A 110 is not installed needs not perform processing. The client 210 in which a printer driver 920 for the network printer A 110 is installed determines whether there is the alternative printer information 910 associated with the printer driver. If the alternative printer information 910 is present, the association of the alternative printer information 910 is canceled, and the alternative printer information 910 is deleted. The environment of the client 210 is returned to the state before the network printer A 110 left the network by re-setting the network printer A 110 as output destination information by the printer driver 920. Note that although a printer driver 930 for an alternative printer used for the duration of alternative printing also exists in the client 210, the driver has no influence on the present invention regardless of whether it is deleted or left. Leaving this driver makes it unnecessary to install the driver when the corresponding alternative printer is to be used.

Processing by each network printer and a client in this embodiment will be described again with reference to the accompanying flowcharts.

Figure 10:
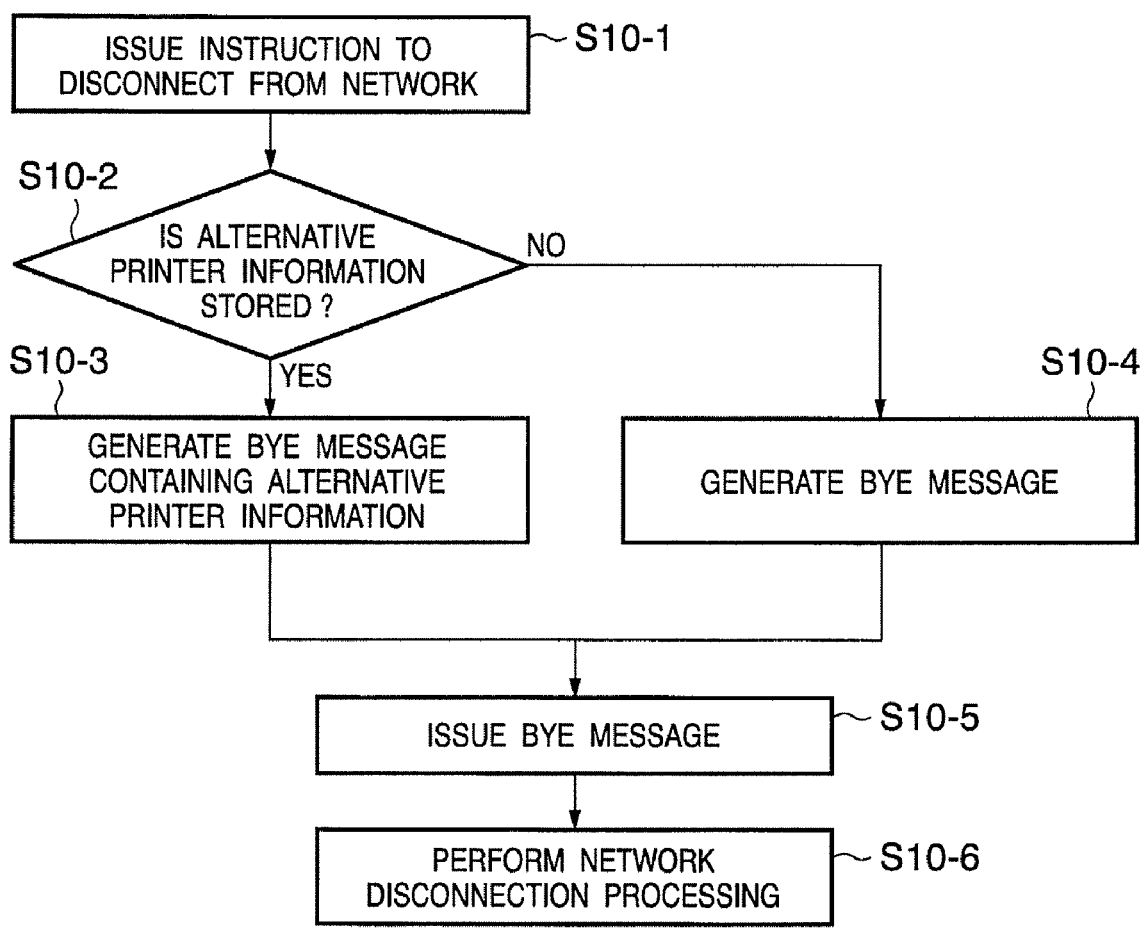
FIG. 10 is a flowchart showing a Bye message issuing processing procedure by a network printer in the first embodiment.

FIG. 10 is a flowchart showing a procedure for issuing a Bye message when a network printer connected to the network receives a power OFF or network disconnection instruction from the operation panel 30.

First of all, upon receiving a disconnection instruction from the network (step S10-1), the network printer determines whether alternative printer information is stored in it (step S10-2). If the information is not stored, the printer generates a normal Bye message (step S10-4). If the alternative printer information is stored, the printer generates a Bye message containing the alternative printer information (step S10-3). The process then advances to step S10-5 to broadcast the Bye message generated in step S10-3 or S10-4. The process then advances to step S10-6 to perform network disconnection processing. Note that this network disconnection processing includes power-off processing. In some case, however, this processing may be the processing of disabling the network controller 25 including a network printer.

FIG. 11 is a flowchart showing the processing executed by a client which has received a Bye message from a network printer. The program associated with this flowchart is a resident program for monitoring a Bye message from the network when the OS of the client is activated.

Upon receiving a Bye message from a network printer (step S11-1), the CPU 1 of the client determines whether the printer driver for the network printer which has issued the Bye message is installed in the OS (step S11-2). If the driver is not registered, since the printer which has not been used is disconnected from the network, the processing by the client with respect to the Bye message is terminated.

If it is determined in step S11-2 that a Bye message is received from the network printer for the installed printer driver, it is determined whether alternative printer information exists in the Bye message (step S11-3). If it is determined that the alternative printer information does not exist, the processing by the client with respect to the Bye message is terminated. Note, however, that since the user who operates the client cannot use the printer which has been used, for example, the printer driver may be displayed in an inactive state (grayed out on the GUI).

Upon determining that alternative printer information exists in the received Bye message, the client stores the printer driver for the printer which has issued the Bye message and the alternative printer information in association with each other, and also stores information which specifies the printer which has issued the Bye message, thus terminating the processing at the time of the reception of the Bye message.

Figure 12:
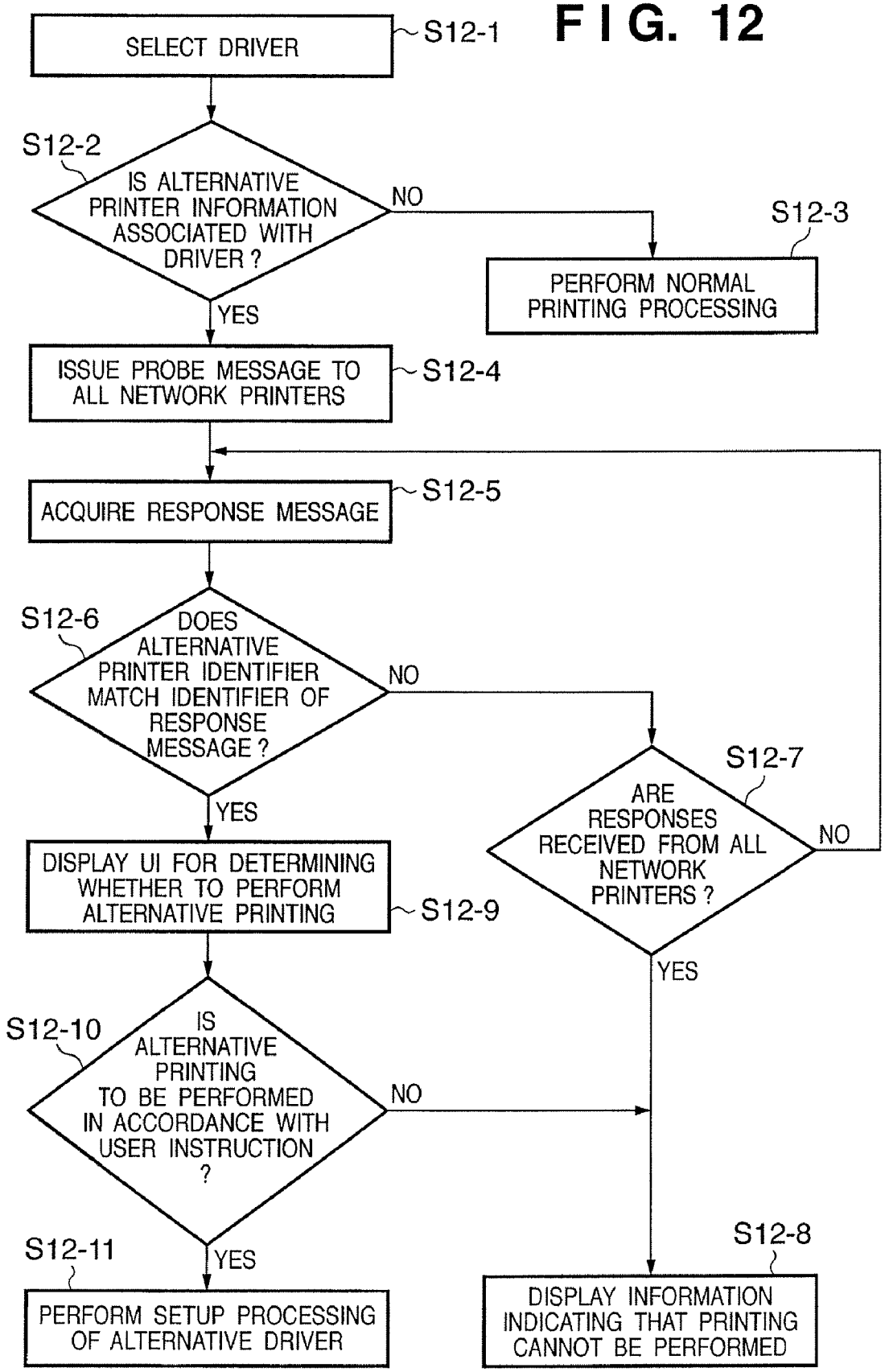
FIG. 12 is a flowchart showing a processing procedure to be executed when a printer driver selection event occurs in a client in the first embodiment.

FIG. 12 is a flowchart showing selection processing for a printer driver in the client. A situation in which a printer driver is to be selected occurs when the user changes the settings of the printer driver or an application generates a print request. The processing shown in FIG. 12 is a processing procedure to be executed when such a situation occurs.

When a printer driver registered in the client is selected (step S12-1), the printer driver determines whether alternative printer information is associated with itself (step S12-2). If alternative printer information is not associated, the client performs normal printing processing such as setting change by the user and printing processing (step S12-3).

If it is determined in step S12-2 that alternative printer information is associated with the printer driver, the process advances to step S12-4 to generate a Probe message for a search for a network printer and broadcast it. The client then waits for the reception of a response message from each network printer.

Upon receiving a response message (step S12-5), the client extracts the printer identifier (IP address) of the issuing source of the response message, and compares it with the identifier (IP address) of the alternative printer in the alternative printer information associated with the printer driver (step S12-6). If it is determined that they do not match each other, since it indicates that the network printer which has issued the response message is not an alternative printer, the process advances to step S12-7 to determine whether a response message is received from another network printer. If it is determined that another response message is received, the process returns to step S12-5 to repeat the above processing. If all the response messages do not match the alternative printer information, the process advances to step S12-8 to display a message indicating that printing cannot be performed by using the printer driver, thus terminating this processing.

In addition, if it is determined that a response message is received from the network printer specified by the alternative printer information, the process advances to step S12-9 to display a UI which makes an inquiry whether alternative printing shown in FIG. 8A or 8B is actually performed, and to wait for an instruction from the user. The user operates the pointing device to issue an instruction whether to perform printing by using the alternative printer.

In step S12-10, it is determined whether an instruction to perform printing by using the alternative printer is input. If an instruction not to perform printing by using the alternative printer is input, the process advances to step S12-8 to display a message indicating that printing is canceled. This processing is then terminated. If it is determined that an instruction to perform printing by using the alternative printer is input, the process advances to step S12-11 to transfer the response message from the alternative printer to the OS to make it perform driver setup processing. That is, any message other than a response message from the alternative printer is not notified to the OS. As a result, the OS performs setup processing for only the printer driver for the alternative printer (if it has already been installed, the OS performs no installation).

Figure 13:
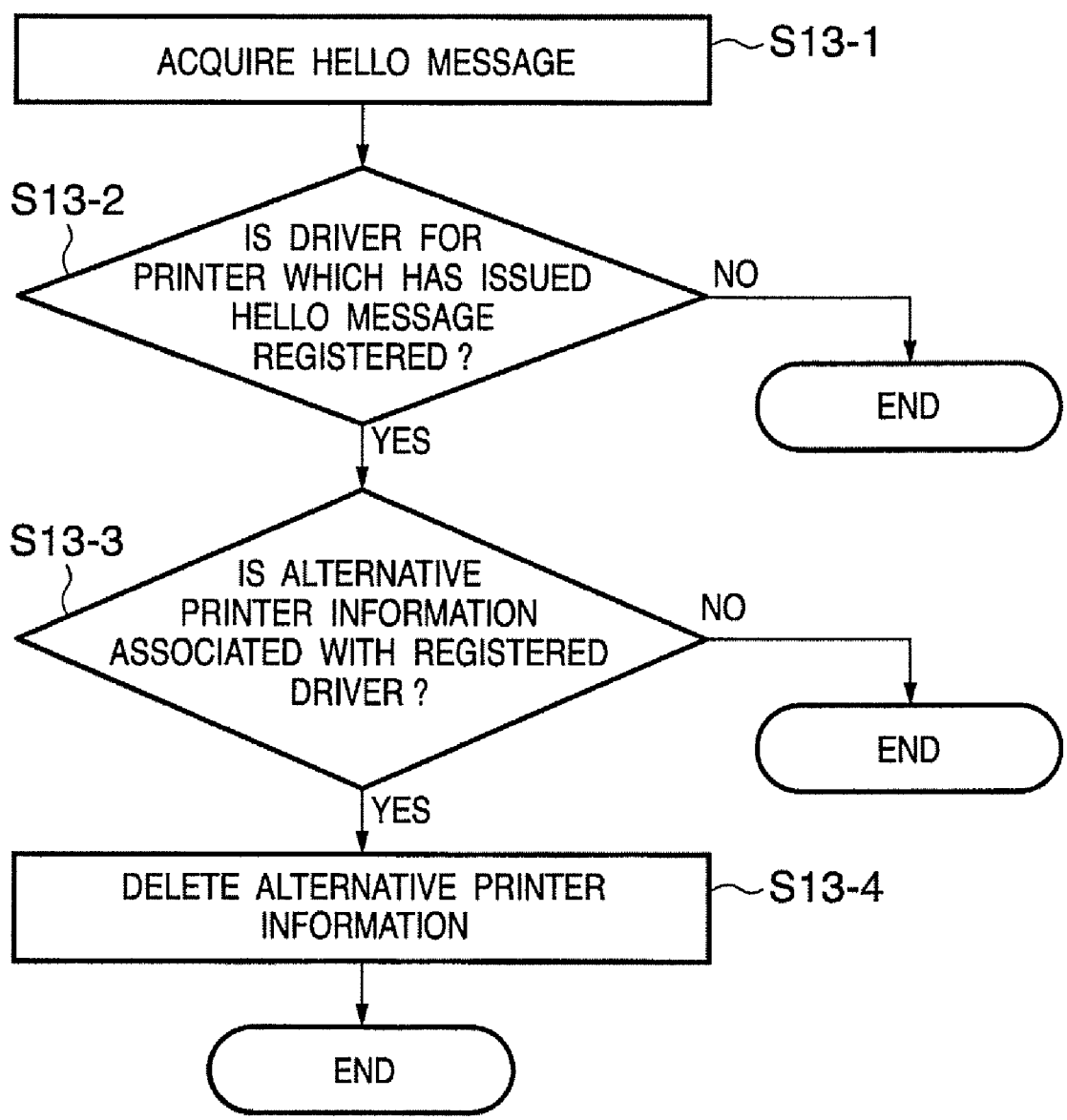
FIG. 13 is a flowchart showing a processing procedure to be executed when a client received a Hello message in the first embodiment.

FIG. 13 is a flowchart showing the processing to be performed when a client receives a Hello message issued when a network printer is connected to the network. This processing is also implemented by a program resident in the memory of the client.

When the client receives a Hello message from a network printer (step S13-1), the process advances to step S1302 to determine whether a printer driver for the network printer which has issued the Hello message has already been registered (step S13-2). If the driver has not been registered, since it indicates that the Hello message is one from a network printer, the processing is terminated without any operation. As a result, if many printers exist on the network, printer drivers for all the printers are not installed. This can prevent the memory of the client from being excessively consumed.

If it is determined in step S13-2 that the printer driver for the printer as the issuing source of the Hello message has already been installed in the OS, the process advances to step S13-3 to determine whether alternative printer information associated with the printer driver for the issuing source of the Hello message exists. If this alternative printer information does not exist, this processing is terminated. If it is determined that the alternative printer information exists, it indicates that the network printer used before printing by the alternative printer has entered the network again. The process then advances to step S13-4 to delete the alternative printer information. This makes it possible to perform printing processing by using the network printer which has initially been used.

As described above, according to this embodiment, when leaving the network, a network printer broadcasts a network leaving message (Bye message) containing alternative printer information for specifying an alternative printer. This makes it possible for the network printer to notify the client which has used the printer driver for the network printer of the inability of use of the printer and the location of an alternative printer. Upon receiving the network leaving message from the network printer in use, the client (e.g., a PC) which uses the network printer can perform printing by using an alternative printer on the basis of the information indicating the leave and the information specifying the alternative printer. This can prevent a driver for a network printer from being unnecessarily installed.

Note that the above embodiment has exemplified the case wherein a Probe message is broadcast to check the location of an alternative printer. However, since the IP address of an alternative printer is written in alternative printer information, a Probe message may be unicast to the IP address to check the location of an alternative printer depending on whether a response message can be received.

Second Embodiment

According to the above embodiment, a network printer transmits a Bye message storing alternative printer information when the operator operates the operation panel of the network printer to input a network disconnection instruction. However, the present invention is not limited to this.

For example, when the network printer cannot be used for a short period of time due to paper jam or maintenance such as toner replenishment, alternative printing can also be performed. The second embodiment will exemplify a case wherein a Bye message is issued without through the operator. Paper frequently runs out in the case of a user (especially a company) who prints a relatively large amount of paper. If, therefore, the printer in use is switched to an alternative printer every time paper runs out, the user may be confused. In other words, in a case wherein the printer can be restored to a printable state within a relatively short period of time, it is desired to wait for the restoration without issuing a Bye message.

The second embodiment will therefore exemplify a case wherein a network printer cannot execute subsequent print jobs without any delay due to some cause, the issuing timing of a Bye message is adjusted in accordance with the cause.

Figure 14:
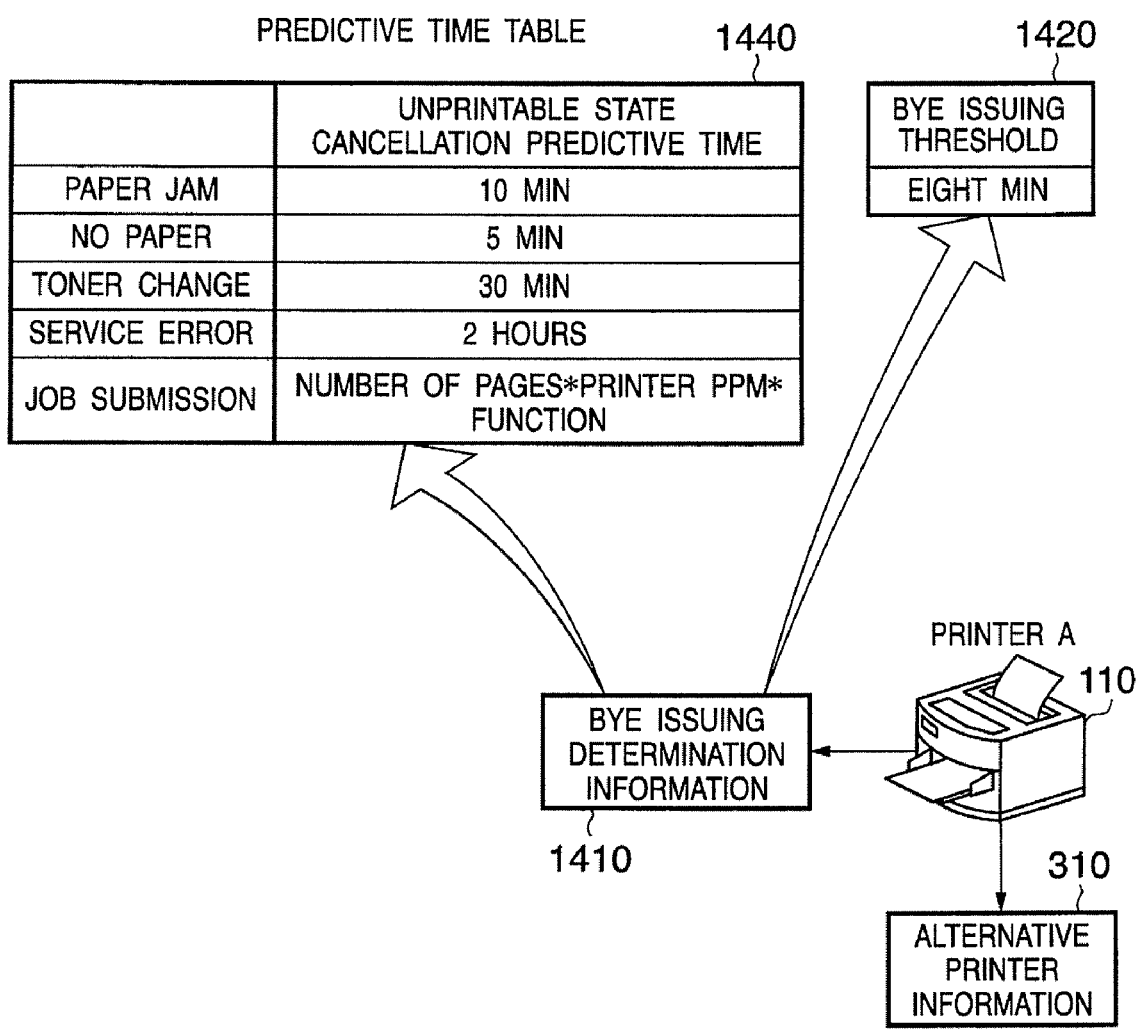
FIG. 14 is a view showing the information which a network printer stores in the second embodiment.

FIG. 14 shows the information which is stored in advance in a network printer in the second embodiment. This information is set through an operation panel 30 and stored in a hard disk. Assume that alternative printer information 310 described in the first embodiment is stored/held in a network printer.

Referring to FIG. 14, a Bye issuing determination information 1410 comprises a predictive time table 1440 and Bye issuing threshold information 1420.

The predictive time table 1440 stores predictive values indicating how much times a printer A 110 cannot perform printing processing upon occurrence of events such as paper jam, "no paper", and print job submission. This table exemplifies a case wherein fixed values such as 10 min and five min are set for paper jam and "no paper", respectively, and when a print job is submitted, a function is set with parameters such as the number of pages, the time taken for printing by the printer A 110 per page, and a function, e.g., double-sided printing.

The Bye issuing threshold information 1420 is a threshold indicating how much time the printer cannot perform printing processing due to the occurrence of an event before it is determined to issue a Bye message containing alternative printer information.

When the respective states defined by the predictive time table 1440 occur (when events occur), a CPU 21 of the printer A 110 adds the corresponding predictive time values and updates the total predictive value. If an event is complete (for example, sheets are replenished in a "no paper" state), the corresponding predictive time value is subtracted from the total predictive value to update it. If the total predictive value exceeds the Bye issuing threshold, a Bye message in which alternative printer information is written is issued.

Note that it is preferable to check, on the basis of, for example, a message based on the WS-Discovery specifications, whether an alternative printer can currently perform printing processing. When alternative printing is to be performed within a short period of time, if the alternative printer cannot perform printing processing at this point of time, alternative printing loses its significance. This only confuses the user on the client side.

Even after a Bye message is issued when the total predictive value due to the respective events exceeds the Bye issuing threshold 1420, the total predictive value is kept updated every time an event is complete or a new event occurs. When the total predictive value becomes smaller than the Bye issuing threshold 1420, the CPU 21 of the network printer A 110 issues the Hello message shown in FIG. 9.

Figure 15:
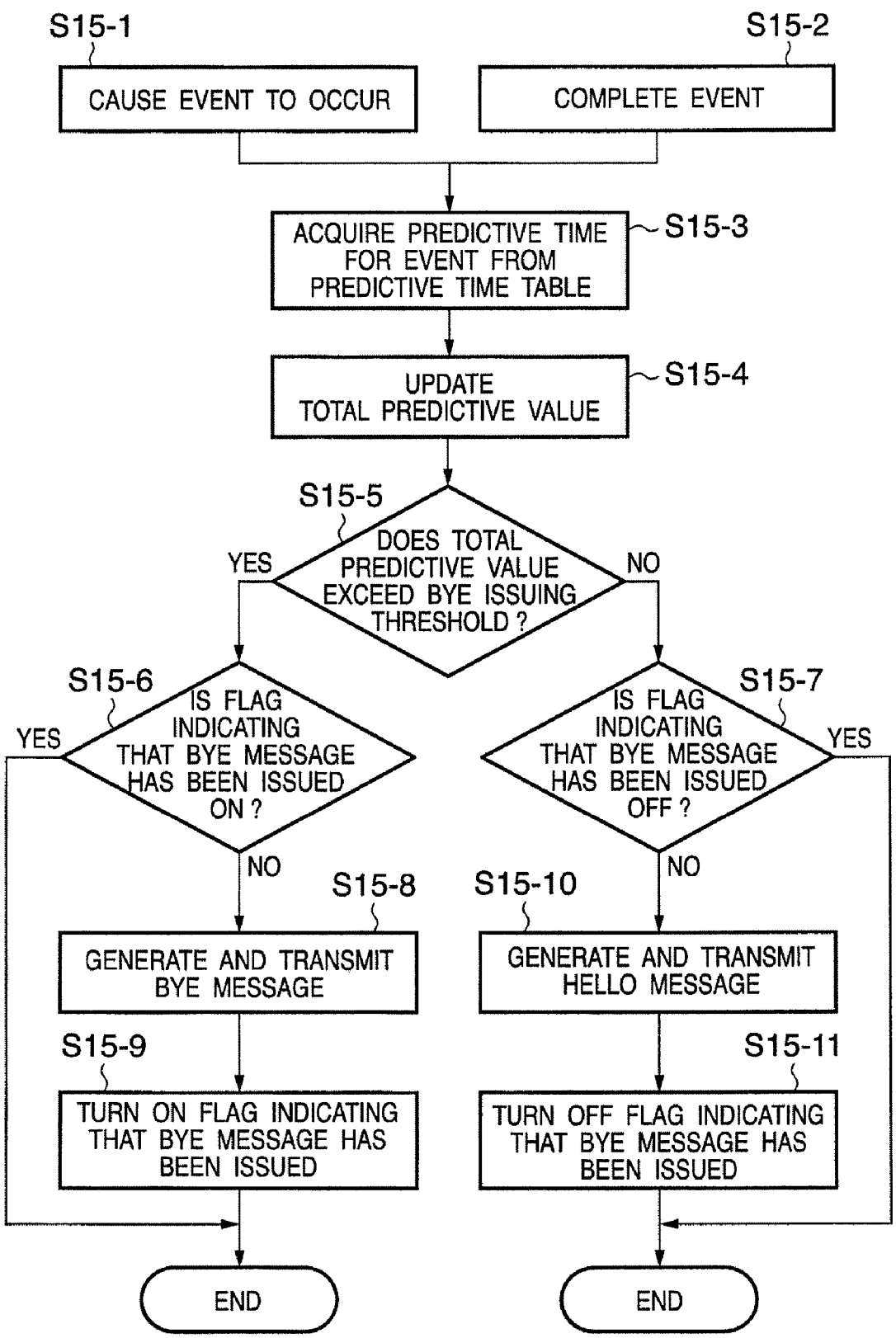
FIG. 15 is a flowchart showing a processing procedure by a network printer in the second embodiment.

FIG. 15 is a flowchart showing a processing procedure executed by a network printer in the second embodiment.

Upon reception of a print job from the network or occurrence of an event such as paper jam in the printer which is detected by a sensor (not shown) (step S15-1), the network printer acquires a predictive time corresponding to the event from the predictive time table 1440 (step S15-3), and adds it to the total predictive value stored in another area (step S15-4).

When processing for the received print job is complete or the completion of an event such as paper jam release is detected (step S15-2), the predictive value of the corresponding event is subtracted from the total predictive value (step S15-4).

It is then determined whether the updated total predictive value exceeds the Bye issuing threshold (step S15-5). If the total predictive value exceeds the threshold, the process advances to step S15-6 to check a flag indicating whether a Bye message has already been issued and determine whether the flag is ON. When the flag is ON, since it indicates that a Bye message has already been issued, this processing is terminated. The process then waits for the occurrence of the next event and the completion of the event.

If it is determined in step S15-6 that the flag is OFF instead of ON, the printer generates and transmits a Bye message (step S15-8). The printer then turns on the flag indicating that the Bye message has been issued (step S15-9), and terminates this processing.

If it is determined in step S15-5 that the total predictive value is smaller than the Bye issuing threshold, the process advances to step S15-7 to determine whether the flag indicating whether a Bye message has been issued is ON or OFF. If it is determined that this flag is OFF, since it is not necessary to issue any Hello message, this processing is terminated.

If it is determined that the flag is ON, i.e., it is determined that a Bye message has been issued and the current total predictive value is smaller than the Bye issuing threshold, the process advances to step S15-10 to generate and transmit a Hello message. With this operation, the flag is turned off and this processing is terminated.

Note that processing executed by each client in the second embodiment is the same as that in the first embodiment. In addition, the second embodiment may be combined with the Bye message issuing processing described in the first embodiment Third Embodiment In the first and second embodiments, when a given network printer issues a Bye message containing alternative printer information due to some cause, a client in which a printer driver for the network printer is installed uses a designated alternative printer.

However, the network printer designated as an alternative printer may have already left from the network and issued a Bye message containing alternative printer information. The third embodiment therefore exemplifies the operation of handling such a case. Note that issuing processing of a Bye message may be the same as that in either the first or the second embodiment.

Figure 16:
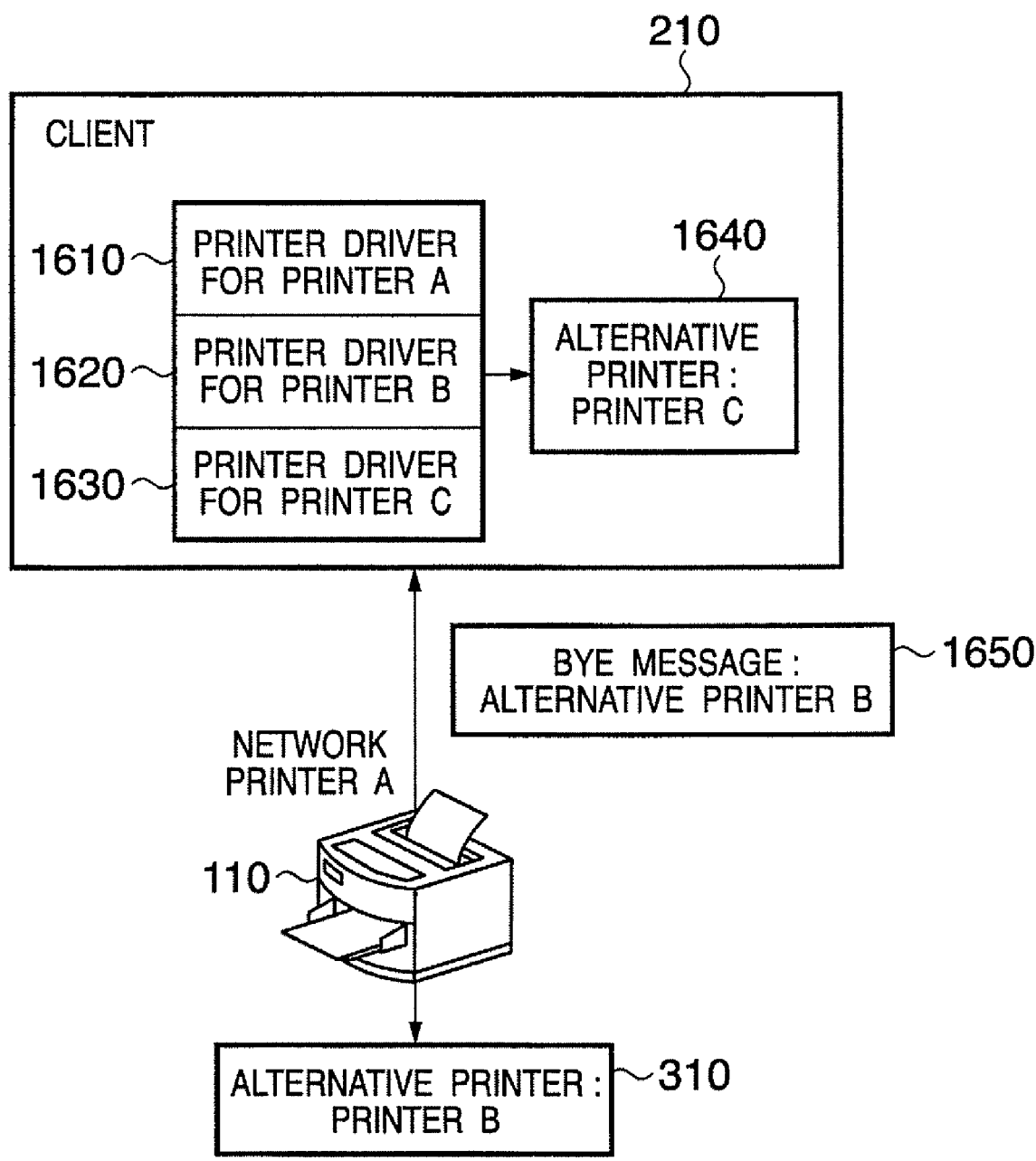
FIG. 16 is a view for explaining the contents of processing by a client in the third embodiment.

FIG. 16 shows a state wherein a client 210 receives a Bye message designating a printer B as an alternative printer from a network printer A 110, and also receives a Bye message designating a printer C as an alternative printer from the printer B.

Upon receiving a Bye message from the network printer A 110, the CPU of the client 210 stores the received alternative printer information in association with a printer driver 1610 for the printer A. Since the CPU can detect that information indicating the alternative printer B is stored in the received Bye message, the CPU detects that alternative printer information 1640 associated with the printer driver 1620 for the printer B exists. The CPU therefore determines whether there is any alternative printer information associated with a printer driver 1630 for the printer C. In the case shown in FIG. 16, since there is no alternative printer information associated with the printer driver 1630 for the printer C, the printer C is finally determined as an alternative printer to be used.

With the above operation, it suffices if the client sequentially searches for a printer driver installed in the OS and alternative printer information associated with the driver. Obviously, this processing can cope with triple and quadruple alternative printer schemes as well as the above double alternative printer scheme.

The embodiments of the present invention have been described above. This embodiment has exemplified the network printer as a network device, and the printer driver as a device driver to be installed in a client. However, the present invention is not limited to this. For example, the present invention can also be applied to another type of network device such as a network facsimile apparatus (an apparatus which faxes document data transmitted from a client on the network to a designated communication partner), or a network scanner.

The embodiments have been described on the premise that network devices (network printers) connect to a wired network (Ethernet). However, the present invention can be applied to a case wherein network devices connect to a LAN through wireless LAN communication means. From the viewpoint of an overall system, the present invention can be applied to a case wherein wired and wireless communication means exist together.

As described in the embodiments, since processing on the client side can be implemented by an application program executed on the client, the present invention also incorporates such a computer program. In addition, computer programs are generally stored in a computer readable storage medium such as a CD-ROM, and are set in a computer. The programs are then copied or installed in the system to be implemented. Obviously, therefore, the present invention incorporates such a computer readable storage medium.

As has been described above, according to a network compliant output device of the present invention, when the device is to leave the network for maintenance, a network leaving message containing information specifying an alternative network compliant output device, which is input in advance, is transmitted. As a consequence, a client such as an information processing apparatus which has used the network compliant output device can notify an alternative network compliant output device.

The information processing apparatus of the present invention manages device drivers for network devices while associating them with alternative device information. When a network leaving message containing information specifying an alternative network device is received, setup processing of the device driver for the alternative device is executed. This makes it possible to issue a job in normal operation without performing any complicated operation. In addition, this can prevent unnecessary drivers for network devices from being installed, and hence can suppress the excessive consumption of the limited memory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-303711, filed on Oct. 18, 2005, which is hereby incorporated by reference herein in its entirety.

What is claimed is:

1. An information processing apparatus which allows network communication means to be mounted therein, detects a network compliant output device compatible with network Plug and Play through the network communication means, and is equipped with an operating system which controls to install a corresponding device driver, comprising:
first determination means for, when receiving a network leaving message from a network compliant output device through the network communication means, determining whether or not a device driver corresponding to the network compliant output device had already been installed and whether the network leaving message contains alternative device information specifying an alternative network compliant output device;
association means for, when said first determination means determines that the device driver corresponding to the network compliant output device had been installed and the received network leaving message contains alternative device information, storing the alternative device information in storage means in association with the device driver for the network compliant output device which leaves from the network;
second determination means for, when a selection event of the device driver occurs, determining whether the alternative device information is stored in the storage means in association with a selected device driver;

control means (1) for, when said second determination means determines that no alternative device information exists, permitting an operating system to perform processing in accordance with the selection event, and (2) for, when said second determination means determines that alternative device information exists, permitting the operating system to perform setup processing of a device driver indicated by the alternative device information so as to permit installation of the device driver indicated by the alternative device information;

third determination means for determining, when a network entry message from a network compliant output device is received via the network communication means, whether or not a device driver corresponding to the network compliant device had already been installed and whether or not alternative device information in association with the device driver for the network compliant output device had been stored in the storage means; and deletion means for, when said third determination means determines that the device driver corresponding to the network compliant device which had transmitted the network entry message had already been installed and that the alternative device information in association with the device driver for the network compliant output device had been stored in the storage means, deleting the alternative device information from the storage means, wherein, when said first determination means determines that a device driver corresponding to the network compliant output device which transmitted the network leaving message had already been installed and that network leaving message did not contain alternative device information specifying an alternative network compliant output device, said control means disables the use of the device driver by a user.

2. The apparatus according to claim 1, wherein said control means transmits a search message for making a search for a corresponding network compliant output device through said network communication means to permit installation of a device driver indicated by the alternative device information, and permits the operating system to perform setup processing of a device driver indicated by alternative device information when the search is successful.

3. The apparatus according to claim 1, wherein said control means permits setup of the device driver corresponding to only a network compliant output device indicated by alternative device information.

4. The apparatus according to claim 1, wherein
the network compliant output device has at least a network printing function, and
the selection event of the device driver is an event of starting printing processing by using the network compliant output device.

5. The apparatus according to claim 1, further comprising display means for, when alternative device information contains a character string as an explanatory sentence associated with the corresponding device, displaying the character string.

6. A control method for an information processing apparatus which allows network communication means to be mounted therein, detects a network compliant output device corresponding to network Plug and Play through the network communication means, and is equipped with an operating system which controls to install a corresponding device driver, comprising:

a first determination step of, when receiving a network leaving message from a network compliant output device through the network communication means, determining whether or not a device driver corresponding to the network compliant output device had already been installed and whether the network leaving message contains alternative device information specifying an alternative network compliant output device;

an association step of, when it is determined in the first determination step that a received network leaving message contains alternative device information, storing the alternative device information in storage means in association with a device driver for the network compliant output device which leaves from the network;

a second determination step of, when a selection event of the device driver occurs, determining whether the alternative device information is stored in the storage means in association with a selected device driver;

a control step of, (1) when it is determined in the second determination step that no alternative device information exists, permitting an operating system to perform processing in accordance with the selection event, and of, (2) when it is determined in the second determination step that alternative device information exists, permitting the operating system to perform setup processing of a device driver indicated by the alternative device information so as to permit installation of the device driver indicated by the alternative device information;

a third determination step of determining, when a network entry message from a network compliant output device is received via the network communication means, whether or not a device driver corresponding to the network compliant device had already been installed and whether or not alternative device information in association with the device driver for the network compliant output device had been stored in the storage means; and a deletion step of, when it is determined in said third determination step that the device driver corresponding to the network compliant device which had transmitted the network entry message had already been installed and that the alternative device information in association with the device driver for the network compliant output device had been stored in the storage means, deleting the alternative device information from the storage means, wherein, when it is determined in said first determination step that a device driver corresponding to the network compliant output device which transmitted the network leaving message had already been installed and that network leaving message did not contain alternative device information specifying an alternative network compliant output device, said control means disables the use of the device driver by a user.

7. A non-transitory computer-readable storage medium storing, in executable form, a program for causing an information processing apparatus which allows network communication means to be mounted therein, detects a network compliant output device corresponding to network Plug and Play through the network communication means, and is equipped with an operating system which controls to install a corresponding device driver, the program functioning as:

first determination means for, when receiving a network leaving message from a network compliant output device through the network communication means, determining whether or not a device driver corresponding to the network compliant output device had already been installed and whether the network leaving message contains alternative device information specifying an alternative network compliant output device;

association means for, when said first determination means determines that the device driver corresponding to the network compliant output device had been installed and the received network leaving message contains alternative device information, storing the alternative device information in storage means in association with the device driver for the network compliant output device which leaves from the network;

second determination means for, when a selection event of the device driver occurs, determining whether the alternative device information is stored in the storage means in association with a selected device driver;

control means (1) for, when said second determination means determines that no alternative device information exists, permitting an operating system to perform processing in accordance with the selection event, and (2) for, when said second determination means determines that alternative device information exists, permitting the operating system to perform setup processing of a device driver indicated by the alternative device information so as to permit installation of the device driver indicated by the alternative device information;

third determination means for determining, when a network entry message from a network compliant output device is received via the network communication means, whether or not a device driver corresponding to the network compliant device had already been installed and whether or not alternative device information in association with the device driver for the network compliant output device had been stored in the storage means; and deletion means for, when said third determination means determines that the device driver corresponding to the network compliant device which had transmitted the network entry message had already been installed and that the alternative device information in association with the device driver for the network compliant output device had been stored in the storage means, deleting the alternative device information from the storage means, wherein, when said first determination means determines that a device driver corresponding to the network compliant output device which transmitted the network leaving message had already been installed and that network leaving message did not contain alternative device information specifying an alternative network compliant output device, said control means disables the use of the device driver by a user.

8. A network system comprising:

a network compliant output device which includes network communication means, executes a job in accordance with a request received from a network through the network communication means, and corresponds to network Plug and Play; and an information processing apparatus which allows network communication means to be mounted therein, detects a network compliant output device corresponding to network Plug and Play through the network communication means, and is equipped with an operating system which controls to install a corresponding device driver, wherein said each network compliant output device comprises input means for inputting information specifying an alternative network compliant output device for executing a job in substation for the device, and transmission means for transmitting a network leaving message containing information specifying an alternative network compliant output device, which is input by said input means, when the device leaves the network under a predetermined condition, and said each information processing apparatus comprises first determination means for, when receiving a network leaving message from a network compliant output device through the network communication means, determining whether or not a device driver corresponding to the network compliant output device had already been installed and whether the network leaving message contains alternative device information specifying an alternative network compliant output device;

association means for, when said first determination means determines that the device driver corresponding to the network compliant output device had been installed and the received network leaving message contains alternative device information, storing the alternative device information in storage means in association with the device driver for the network compliant output device which leaves from the network;

second determination means for, when a selection event of the device driver occurs, determining whether the alternative device information is stored in the storage means in association with a selected device driver; and control means (1) for, when said second determination means determines that no alternative device information exists, permitting an operating system to perform processing in accordance with the selection event, and (2) for, when said second determination means determines that alternative device information exists, permitting the operating system to perform setup processing of a device driver indicated by the alternative device information;

third determination means for determining, when a network entry message from a network compliant output device is received via the network communication means, whether or not a device driver corresponding to the network compliant device had already been installed and whether or not alternative device information in association with the device driver for the network compliant output device had been stored in the storage means; and deletion means for, when said third determination means determines that the device driver corresponding to the network compliant device which had transmitted the network entry message had already been installed and that the alternative device information in association with the device driver for the network compliant output device had been stored in the storage means, deleting the alternative device information from the storage means, wherein, when said first determination means determines that a device driver corresponding to the network compliant output device which transmitted the network leaving message had already been installed and that network leaving message did not contain alternative device information specifying an alternative network compliant output device, said control means disables the use of the device driver by a user.

* * * * *